Patented Jan. 7, 1936

2,026,908

UNITED STATES PATENT OFFICE 2,026,908

WATERINSOLUBLE AZODYESTUFFS

Friedrich Muth, Leverkusen-I. G.-Werk, Germany, assignor to General Aniline Works, Inc., New York, N. Y., a corporation of Delaware No Drawing. Application June 26, 1934, Serial No. 732,535. In Germany October 5, 1932

12 Claims. (Cl. 260—53)

The present invention relates to waterinsoluble azodyestuffs, and to fibres dyed therewith, more particularly it relates to dyestuffs which may be represented by the general formula:

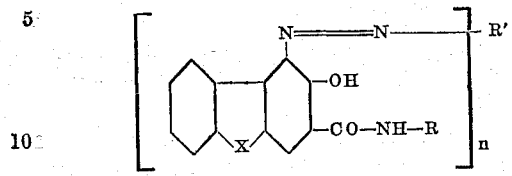

wherein $x$ stands for a sulfur or an oxygen atom, R stands for an aromatic radical free from substituents inducing solubility in water, for instance, for a benzene-, naphthalene-, anthracene- or carbazole nucleus which nuclei may be substituted, for example, by alkyl, alkoxy, halogen, the nitro group and the like, R' stands for an aromatic radical free from substituents inducing solubility in water, for example, for a benzene-, naphthalene-, anthracene-, phenanthrene-, chrysene-, pyrene-, fluoranthene-, diphenyleneoxide-, diphenylenesulfide-, diphenylenesulfoxide-, diphenylenesulfone-, fluorene-, fluorenone-, carbazole-, N-alkylcarbazole-, N-aralkylcarbazole-, N-arylcarbazole-, indole-, naphthindole-, benzothiazole-, naphthothiazole-radical which may bear substituents, such as halogen, the cyano group, the nitro group, a carboxylic acid ester group, the group

—CO—CH$_2$—O—C$_6$H$_5$, the acetylamino group, the methoxy-acetyl-amino group, the benzoylamino group, a mono- or di-alkyl-, -aralkyl- or -arylamino-group, methoxy, ethoxy, butoxy, benzyloxy, phenoxy, an alkylketone group, an arylketone group, the benzoyl group, an SO$_2$-alkyl-, -aralkyl- or -aryl- group, a mono- or di-alkyl-,-aralkyl- or -arylsul-foneamide group, methyl, ethyl, propyl, butyl, amyl, benzyl, phenyl, trifluoromethyl, the radical of a diazo compound, such as —N=N—C$_6$H$_5$, —N=N—C$_6$H$_4$—N=N—C$_6$H$_5$, and $n$ stands for one of the numbers one and two.

My new dyestuffs of the above identified general formula are obtainable by diazotizing in the usual manner a primary amine suitable for preparing azodyestuffs free from a substituent inducing solubility in water and coupling in substance or on a substratum, especially the vegetable fibre, with an arylamide of the general formula:

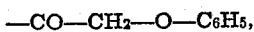

wherein $x$ and R mean the same as stated above.

The dyestuffs thus obtained generally yield brown to blackish brown to black shades, those prepared on the fibre according to one of the usual dyeing or printing processes being distinguished by good fastness properties.

The coupling components used in the manufacture of my new dyestuffs have been described in British Patent 426,403.

The invention is illustrated by the following examples, without being limited thereto:

*Example 1.*—2 grams of the arylamide from 3-hydroxydiphenylene-oxide-2-carboxylic acid and 1-amino-2-methoxy-4-chlorobenzene are dissolved in the usual manner in a mixture from alcohol and caustic soda, and the solution is poured into one litre of water containing 10 ccs. of aqueous caustic soda lye of 38° Bé. strength and 10 ccs. of Turkey red oil. In this solution 50 grams of cotton yarn are impregnated for ½ hour, squeezed and developed for half an hour in a developing bath prepared in the usual manner from an equimolecular quantity of diazotized 1-amino-2-methyl-4-nitrobenzene. The cotton yarn is then rinsed, soaped in a boiling bath, again rinsed and dried. A dark brown is thus obtained; the dyestuff corresponds to the following formula:

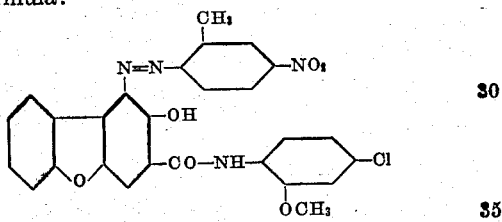

In an analogous manner the impregnated yarn yields with diazotized:

| | |
|---|---|
| 1-amino-2,5-dichlorobenzene | a yellowish brown. |
| 1-amino-2-nitro-4-chlorobenzene | a dark brown. |
| 1-amino-2-methoxy-4-nitrobenzene | Do. |
| 1-amino-4-nitrobenzene | an olive brown. |
| 1-amino-2-methyl-5-nitrobenzene | a yellowish dark brown. |
| 4-aminodiphenylamine | a reddish brown. |
| 4-amino-2-methyl-3'-methyl-1,1'-azobenzene | a yellowish dark brown. |
| 1-amino-2-chloro-5-methoxy-4-benzoylaminobenzene | Do. |

The 3-hydroxydiphenyleneoxide-2-carboxylic acid-anilide yields by coupling with diazotized:

| | |
|---|---|
| 1-amino-3-chlorobenzene | a yellowish brown. |
| 1-amino-2,5-dichlorobenzene | a dark brown. |
| 1-amino-2-methoxy-5-chlorobenzene | a blackish brown. |
| 1-amino-2-methoxy-4-benzoylamino-5-methylbenzene | Do. |
| 1-amino-2-methoxy-4-benzoylamino-5-methoxybenzene | Do. |
| 1-amino-2-methyl-4-chlorobenzene | a brown. |
| 1-amino-2-methyl-3-chlorobenzene | Do. |
| 1-amino-2-methyl-5-chlorobenzene | Do. |
| 1-amino-2-methoxybenzene-5-sulfodiethylamide | Do. |
| 1-amino-2-chloro-4-benzoylamino-5-methoxybenzene | Do. |
| 1-amino-2-methyl-5-benzoylamino-4-methylbenzene | Do. |
| 4-amino-3-methoxydiphenylamine | a reddish brown. |
| 1-aminoanthraquinone | a reddish blackish brown. |

The hydroxydiphenyleneoxide-2-carboxylic acid-2'-toluidide yields by coupling with diazotized:

1-amino-2,5-dichlorobenzene_____ a brown.
1-amino-2-chloro-5-ω-trifluoro-methyl- a yellowish brown.
  benzene.
4-amino-2,5-dimethoxy-4'-nitro-1,1'-azo- a bluish black.
  benzene.

The hydroxydiphenyleneoxide-2-carboxylic acid-2',3'-dimethylanilide yields by coupling with diazotized:

2,5-dichloroaniline_____ a reddish brown.
1-amino-4-benzoylamino-2-chloro-5-     Do.
  methoxybenzene.

The hydroxydiphenyleneoxide-2-carboxylic acid-3',4'-dimethylanilide yields by coupling with diazotized:

4-aminodiphenylamine_____ a reddish brown.
1-amino-4-benzoylamino-2-chloro-5-     Do.
  methoxybenzene.
2,5-dichloroaniline_____ a reddish dark brown.

the dyestuff corresponds to the following formula:

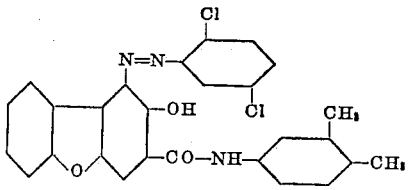

1-amino-2-methyl-5-chlorobenzene_____ a yellowish dark brown.
1-amino-2,4-dimethyl-5-benzoylamino-   a yellowish brown.
  benzene.
4-amino-2,3'-dimethyl-1,1'-azobenzene___ a dark brown.
4-amino-2',3-dimethyl-1,1'-azobenzene___ Do.
4-amino-2,4'-dimethyl-2'-nitro-5-meth-  a blackish brown.
  oxy-1,1'-azobenzene.

The 3-hydroxydiphenyleneoxide-2-carboxylic acid-2',6'-dimethylanilide yields with diazotized:

1-amino-2-methyl-4-chlorobenzene_____ a yellowish brown.
1-amino-2-chloro-5-ω-trifluoro-methyl- Do.
  benzene.
1-amino-2-methoxy-5-chlorobenzene_____ a reddish blackish brown.
1-amino-2,4-dimethyl-5-benzoylamino-   a khaki.
  benzene.
4-amino-2,3'-dimethyl-1,1'-azobenzene__ a reddish brown.
1-aminoanthraquinone_____ a yellowish black brown.

The 3-hydroxydiphenyleneoxide-2-carboxylic acid-2',5'-dimethylanilide yields by coupling with diazotized:

2,5-dichloroaniline_____ a deep brown.

The 3-hydroxydiphenyleneoxide-2-carboxylic acid-3',5'-dimethylanilide yields by coupling with diazotized:

2,5-dichloroaniline_____ a yellowish dark brown.

The 3-hydroxydiphenyleneoxide-2-carboxylic acid-2'-anisidide yields by coupling with diazotized:

1-amino-2,5-dichlorobenzene_____ a yellowish dark brown.
1-amino-2-methoxy-5-sulfodiethylamide_ Do.
1-amino-2-methyl-4-chlorobenzene_____ a yellowish brown.
1-amino-2-methyl-5-chlorobenzene_____ Do.
1-amino-5-benzoylamino-2,4-dimethyl-  Do.
  benzene.
1-amino-2-chloro-5-ω-trifluoromethylbenzene. Do.
1-amino-4-benzoylamino-2-chloro-5-     a reddish brown.
  methoxybenzene.
1-amino-4-benzoylamino-2-methoxy-5-   a blackish brown.
  methylbenzene.
1-aminoanthraquinone_____ Do.
4-amino-3-methyl-2'-methyl-1,1'-azo-   Do.
  benzene.
2-aminodiphenylsulfone_____ a greenish blackish brown.
4-chloro-2-aminodiphenylether_____ a yellowish dark brown.
4-amino-2,5-dimethoxy-4'-nitro-1,1'-azo- a reddish bluish black.
  benzene.

The 3-hydroxydiphenyleneoxide-2-carboxylic acid-2'-phenetidide yields by coupling with diazotized:

2,5-dichloroaniline_____ a yellowish brown.
1-methyl-2-amino-5-nitrobenzene_____ a dark brown.

1-methoxy-2-amino-4-nitrobenzene_____ a khaki brown.
2-aminodiphenylsulfone_____ an olive brown.
1-chloro-2-amino-4-methoxy-5-         an orange brown.
  benzoylaminobenzene.

The 3-hydroxydiphenyleneoxide-2-carboxylic acid-4'-anisidide yields by coupling with diazotized:

1-amino-2,5-dichlorobenzene_____ a dark brown.

The 3-hydroxydiphenyleneoxide-2-carboxylic acid-2'-chloroanilide yields by coupling with diazotized:

2,5-dichloroaniline_____ a brown.

The 3-hydroxydiphenyleneoxide-2-carboxylic acid-3'-chloroanilide yields by coupling with diazotized:

1-amino-3-chlorobenzene_____ a khaki.
2,5-dichloroaniline_____ a reddish dark brown.
1-amino-2-methyl-5-nitrobenzene_____ a khaki olive.
1-amino-2-methyl-5-chlorobenzene_____ a grey olive.
1-amino-2-methyl-3-chlorobenzene_____ a reddish brown.
1-amino-2-chloro-5-ω-trifluoromethyl-  a brownish olive.
  benzene.

The 3-hydroxydiphenyleneoxide-2-carboxylic acid-4'-chloroaniline yields by coupling with diazotized:

2,5-dichloroaniline_____ a brown.

The 3-hydroxydiphenyleneoxide-2-carboxylic acid-2',5'-dichloroanilide yields by coupling with diazotized:

2,5-dichloroaniline_____ a dark brown.

The 3-hydroxydiphenyleneoxide-2-carboxylic acid-3',5'-dichloroanilide yields by coupling with diazotized:

2,5-dichloroaniline_____ a brown.

The 3-hydroxydiphenyleneoxide-2-carboxylic acid-3'-nitroanilide yields by coupling with diazotized:

2,5-dichloroaniline_____ a yellowish brown.

The 3-hydroxydiphenyleneoxide-2-carboxylic acid-2'-methyl-4'-anisidide yields by coupling with diazotized:

1-amino-2,5-dichlorobenzene_____ a reddish dark brown.
1-amino-2-methyl-3-chlorobenzene_____ a dark brown.
1-amino-2-methyl-5-chlorobenzene_____ Do.
1-amino-2-chloro-5ω-trifluoromethyl-   a yellowish dark brown.
  benzene.
2-aminodiphenylenesulfone_____ a greenish grey.
1-amino-2-methoxy-5-chlorobenzene_____ a reddish blackish brown.
1-amino-5-benzoylamino-2,4-dimethyl-  a reddish brown.
  benzene.
1-amino-4-benzoylamino-2-chloro-5-     a reddish deep brown.
  methoxybenzene.
4-amino-2,5-dimethoxy-4'-nitro 1,1'-    a black.
  azobenzene.

The 3-hydroxydiphenyleneoxide-2-carboxylic acid-3'-methyl-4'-anisidide yields by coupling with diazotized:

2-chloroaniline_____ a reddish yellow brown.
3-chloroaniline_____ Do.
2,5-dichloroaniline_____ a yellowish dark brown.
1-amino-2,4-dimethyl-5-benzoylami-    a yellowish brown.
  nobenzene.
1-amino-2-chloro-5-methoxy-4-ben-     a reddish brown.
  zoylaminobenzene.
4-aminodiphenylamine_____ Do.
4-amino-4'-methoxydiphenylamine_____ Do.
o-amino-azo-toluene_____ a reddish dark brown.
m-amino-azo-toluene_____ Do.

The 3-hydroxydiphenyleneoxide-2-carboxylic acid-5'-methyl-2'-anisidide yields by coupling with diazotized:

2,5-dichloroaniline_____ a yellowish brown.

The 3-hydroxydiphenyleneoxide-2-carboxylic acid-3',5'-dimethoxyanilide yields by coupling with diazotized:

2,5-dichloroaniline_____ a dark brown.
2-amino-4-chlorodiphenyleneoxide_____ Do.
1-amino-2-methyl-5-nitrobenzene_____ a yellowish dark brown.
1-amino-2-chloro-5-ω-trifluoromethyl- Do.
  benzene.

| | |
|---|---|
| 1-amino-2-methoxy-5-chlorobenzene | an olive grey. |
| 1-amino-2-methyl-4-chlorobenzene | an olive brown. |
| 1-amino-2-nitro-4-methylbenzene | a blackish brown. |
| 4-amino-2,4'-dimethyl-2'-nitro-5-methoxy-1,1'-azobenzene. | Do. |
| 4-amino-2,5-dimethoxy-4'-nitro-1,1'-azobenzene. | a black. |
| m-amino-azo-toluene | a blackish brown. |
| o-amino-azo-toluene | a yellowish dark brown. |
| 1-amino-2-methyl-3-chlorobenzene | a reddish brown. |
| 1-amino-2-methyl-5-chlorobenzene | Do. |
| 1-amino-2,4-dimethyl-5-benzoylaminobenzene. | a khaki. |
| 1-amino-4-benzoylamino-2-chloro-5-methoxybenzene. | a reddish brown. |
| 1-amino-2-methoxy-5-nitrobenzene | a blackish brown. |

The 3 - hydroxydiphenyleneoxide-2-carboxylic acid-2',5'-diethoxyanilide yields by coupling with diazotized:

| | |
|---|---|
| 2,5-dichloroaniline | a yellowish brown. |

The 3 - hydroxydiphenyleneoxide-2-carboxylic acid-2',4'-dimethoxyanilide yields by coupling with diazotized:

| | |
|---|---|
| 2,5-dichloroaniline | a yellowish brown. |

The 3 - hydroxydiphenyleneoxide-2-carboxylic acid-2',5'-dimethoxyanilide yields by coupling with diazotized:

| | |
|---|---|
| 1-amino-2-methyl-3-chlorobenzene | a reddish brown. |
| 1-amino-2-methyl-5-nitrobenzene | a dark brown. |
| 1-amino-2-methoxy-5-chlorobenzene | Do. |
| 1-amino-2-methoxy-5-sulfodiethylamide. | Do. |
| 2-aminodiphenylsulfone | Do. |
| 1-amino-2,5-dichlorobenzene | a reddish brown. |
| 4-amino-2-methyl-5-methoxy-2'-nitro-4'-methyl-1,1'-azobenzene. | Do. |
| 1-amino-4-benzoylamino-2-methoxy-5-methylbenzene. | a blackish brown. |
| 1-amino-2-chloro-5-ω-trifluoromethylbenzene. | Do. |
| 4-amino-2-methyl-3'-methyl-1,1'-azobenzene. | a yellowish blackish brown. |
| 4-amino-2',3-dimethyl-1,1'-azobenzene | a reddish blackish brown. |
| 4-amino-3-methyl-2'-methyl-1,1'-azobenzene. | Do. |

The 3 - hydroxydiphenyleneoxide-2-carboxylic acid-2'-methyl-4'-chloroanilide yields by coupling with diazotized:

| | |
|---|---|
| 2,5-dichloroaniline | a yellowish dark brown. |

The 3 - hydroxydiphenyleneoxide-2-carboxylic acid-2'-methyl-5'-chloroanilide yields by coupling with diazotized:

| | |
|---|---|
| 1-methyl-2-amino-4-chlorobenzene | a yellowish dark brown. |
| 1-methoxy-2-amino-4-nitrobenzene | a grey. |
| 2,5-diethoxy-1-amino-4-benzoylaminobenzene. | a corinth. |
| 1,3-dimethyl-4-amino-6-benzoylaminobenzene. | a khaki. |
| 1-methyl-2'-methyl-1,1'-azobenzene | a blackish brown. |

The 3 - hydroxydiphenyleneoxide-2-carboxylic acid-2'-methoxy-5'-chloroanilide yields by coupling with diazotized:

| | |
|---|---|
| 2,5-dichloroaniline | a dark brown. |
| 1-amino-2-nitro-4-chlorobenzene | a reddish dark brown. |
| 1-methyl-2-amino-5-nitrobenzene | a blackish brown. |
| 2-aminodiphenylsulfone | an olive brown. |
| 1-amino-2-chloro-5-ω-tri-fluoromethylbenzene. | a yellowish dark brown. |
| 1-chloro-2-amino-4-methoxy-5-benzoylaminobenzene. | a reddish brown. |
| 1-aminoanthraquinone | a dark brown. |
| 2'-methyl-1,1'-azobenzene | Do. |

The 3 - hydroxydiphenyleneoxide-2-carboxylic acid-2'-methoxy-5'-nitroanilide yields by coupling with diazotized:

| | |
|---|---|
| 2,5-dichloroaniline | a dark brown. |

The 3 - hydroxydiphenyleneoxide-2-carboxylic acid-2',4'-dimethoxy-5'-chloroanilide yields by coupling with diazotized:

| | |
|---|---|
| 1-amino-2-methyl-4-nitrobenzene | a blackish brown. |
| 1-amino-2-nitrobenzene | a greyish green. |
| 4-chloro-2-amino-diphenylether | a yellowish blackish brown. |
| 1-amino-4-benzoylamino-2-chloro-5-methoxybenzene. | a reddish brown. |
| 4-amino-3-methyl-2'-methyl-1,1'-azobenzene. | a blackish brown. |

The 3 - hydroxydiphenyleneoxide-2-carboxylic acid-2',5'-dimethoxy-4'-chloroanilide yields by coupling with diazotized:

| | |
|---|---|
| dianisidine | a violet black. |
| 2-aminocarbazole | an orange brown. |
| 2-aminodiphenyleneoxide | a yellowish brown. |
| 3-aminodiphenylenesulfide | Do. |

The 3 - hydroxydiphenyleneoxide-2-carboxylic acid-2'-sulfodiethylamino-4'-chloroanilide yields by coupling with diazotized:

| | |
|---|---|
| 2,5-dichloroaniline | a brown. |

The 2 - methyl - 6 - (3' - hydroxy-2'-carbonylaminodiphenyleneoxide)-benzothiazole yields by coupling with diazotized:

| | |
|---|---|
| 1-amino-2-chloro-5-ω-trifluoromethylbenzene. | a yellowish brown. |

The 3 - hydroxydiphenyleneoxide-2-carboxylic acid-α-naphthylamide yields by coupling with diazotized:

| | |
|---|---|
| 1-amino-3-benzoylamino-4,6-dimethylbenzene. | a brown. |
| 2-aminodiphenylsulfone | a greenish grey. |
| 2-amino-4-chlorodiphenylether | a greyish brown. |
| 1-ω-trifluoromethyl-4-chloro-3-aminobenzene. | an olive green. |
| 1-amino-4-benzoylamino-2-chloro-5-methoxybenzene. | a reddish brown. |

*Example 2.*—33 grams of 3-hydroxydiphenyleneoxide-2-carboxylic acid-2'-toluidide are dissolved in water with the addition of caustic soda, and after the addition of sodium acetate a diazo solution prepared from 13.8 grams of o-nitraniline is introduced. The blackish-brown dyestuff formed is filtered with suction, washed and dried. The dyestuff has the following formula:

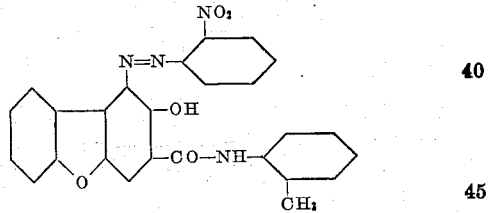

The dyestuff from diazotized 2-nitraniline and 3-hydroxydiphenyleneoxide - 2 - carboxylic acid-4'-chloroanilide, coupled in aqueous pyridine, possesses similar properties.

*Example 3.*—2 grams of the arylamide from 3-hydroxydiphenylenesulfide-2-carboxylic acid and 1-amino-2-methoxy - 4 - chlorobenzene are dissolved by heating with 8 ccs. of alcohol, 4 ccs. of water and 1 cc. of aqueous caustic soda lye of 38° Bé. The solution thus obtained is poured into one litre of water containing 10 ccs. of aqueous caustic soda solution of 38° Bé. strength. In this bath 50 grams of cotton yarn are impregnated for ½ hour, squeezed, and developed in the usual manner by introducing for ½ hour into a diazo solution prepared from 1-amino-2-nitro-4-chlorobenzene. A yellowish blackish brown is thus obtained. The dyestuff corresponds to the following formula:

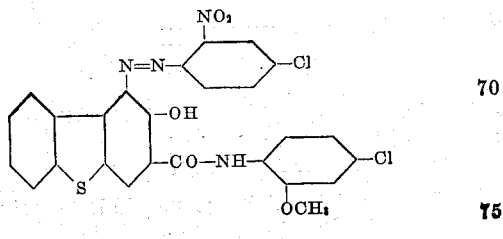

In an analogous manner the same coupling component yields with diazotized:

| | |
|---|---|
| 3-chloroaniline | a reddish brown. |
| 2-nitroaniline | Do. |
| 1-amino-2-nitro-4-methyl-benzene | Do. |
| 1-amino-2-methyl-3-chloro-benzene | Do. |
| 2-aminodiphenylenesulfone | Do. |
| 1-amino-2-chloro-5-ω-trifluoromethyl-benzene | Do. |
| 1-aminoanthraquinone | Do. |
| 3-nitroaniline | a reddish blackish brown. |
| 4-nitroaniline | a blackish brown. |
| 1-amino-2-methyl-4-nitrobenzene | a greenish black. |
| 1-amino-2-methyl-5-nitrobenzene | a dark yellowish brown. |
| 1-amino-2-methoxy-4-nitrobenzene | a bluish black. |
| 1-amino-2-methyl-5-chlorobenzene | a yellowish dark brown. |
| 1-amino-2-chloro-4-benzoylamino-5-methoxybenzene | a violet brown. |
| 4-amino-2-methyl-3-methyl-1,1'-azobenzene | a brownish black. |
| 4-amino-3-methyl-2'-methyl-1,1'-azobenzene | Do. |

The 3-hydroxydiphenylenesulfide-2-carboxylic acid-anilide yields by coupling with diazotized:

| | |
|---|---|
| 1-amino-2,5-dichlorobenzene | a violet brown. |
| 1-amino-2-methyl-5-nitrobenzene | Do. |
| 1-amino-2-methyl-3-chlorobenzene | a reddish dark brown. |
| 1-amino-2-methoxybenzene-5-sulfo-diethylamide | Do. |
| 1-amino-2-methyl-5-chlorobenzene | a reddish black. |
| 1-amino-2-methoxy-5-chlorobenzene | a greenish black. |
| 4-amino-3-methyl-2'-methyl-1,1'-azobenzene | Do. |
| 1-amino-2-chloro-4-benzoylamino-5-methoxybenzene | a violet dark brown. |
| 1-amino-2-methyl-5-benzoylamino-4-methylbenzene | a greenish dark brown. |

The 3-hydroxydiphenylenesulfide-2-carboxylic acid-2'-toluidide yields by coupling with diazotized:

| | |
|---|---|
| 1-amino-2,5-dichlorobenzene | a blackish brown. |
| 1-amino-2-methyl-3-chlorobenzene | a violet blackish brown. |
| 1-amino-2-methyl-5-nitrobenzene | Do. |
| 1-amino-2-methoxy-5-chlorobenzene | a corinth. |
| 1-amino-2-methoxybenzene-5-sulfo-diethylamide | a reddish brown. |
| 1-amino-4-benzoylamino-2,5-diethoxybenzene | a reddish bluish black. |
| 1-amino-2-methoxy-4-benzoylamino-5-methoxybenzene | Do. |
| 1-amino-2-chloro-4-benzoylamino-5-methoxybenzene | a violet black. |
| 4-amino-2-methyl-5-methoxy-2'-nitro-4'-methyl-1,1'-azobenzene | a black. |

The 3-hydroxydiphenylenesulfide-2-carboxylic acid-4'-toluidide yields by coupling with diazotized:

| | |
|---|---|
| 3-nitraniline | a reddish dark brown. |
| 1-methoxy-2-aminobenzene-4-sulfodiethylamide | Do. |
| 1-methyl-2-amino-5-chlorobenzene | a dark reddish brown. |
| 1-methoxy-2-amino-4-chlorobenzene | a greenish black. |
| 2,4'-dimethyl-2'-nitro-5-methoxy-4-amino-1,1'-azobenzene | Do. |
| 4-amino-3-methyl-2'-methyl-1,1'-azobenzene | a blackish brown. |

The 3-hydroxydiphenylenesulfide-2-carboxylic acid-2'-anisidide yields by coupling with diazotized:

| | |
|---|---|
| 1-amino-2,5-dichlorobenzene | a reddish blackish brown. |
| 1-amino-2-chloro-4-benzoylamino-5-methoxybenzene | Do. |
| 1-amino-3-nitrobenzene | a blackish brown. |
| 1-amino-2-methyl-5-nitrobenzene | Do. |
| 1-amino-2-methyl-3-chlorobenzene | a reddish dark brown. |
| 1-amino-2-methyl-5-chlorobenzene | a greenish dark brown. |
| 1-amino-2-methyl-4-nitrobenzene | a greenish black. |
| 1-amino-2-nitro-4-methylbenzene | a reddish brown. |
| 1-amino-2-methoxybenzene-5-sulfodiethylamide | Do. |
| 2-aminodiphenylsulfone | Do. |
| 1-amino-2-methoxy-5-nitrobenzene | a violet dark brown. |
| 1-amino-2-methoxy-5-chlorobenzene | a violet brown. |
| 1-amino-2-chloro-5-ω-trifluoromethylbenzene | a dark brown. |
| 2-aminocarbazole | Do. |
| 2-aminodiphenyleneoxide | Do. |
| 3-aminodiphenylenesulfide | Do. |
| 4-amino-2,5-dimethoxy-4'-nitro-1,1'-azobenzene | a black. |
| 4-amino-2-methyl-5-methoxy-2'-nitro-4'-methyl-1,1'-azobenzene | Do. |
| 4-amino-2-methyl-3'-methyl-1,1'-azobenzene | a brownish black. |
| dianisidine | a bluish black. |

The 3-hydroxydiphenylenesulfide-2-carboxylic acid-4'-anisidide yields by coupling with diazotized:

| | |
|---|---|
| 3-nitraniline | a reddish dark brown. |
| 1,3-dimethyl-4-amino-5-benzoylaminobenzene | Do. |
| 1-methoxy-2-amino-4-chlorobenzene | a corinth. |
| 2,4'-dimethyl-2'-nitro-5-methoxy-4-amino-1,1'-azobenzene | a black. |
| 1-amino-5-benzoylamino-2,4-dimethylbenzene | a dark brown. |

The 3-hydroxydiphenylenesulfide-2-carboxylic acid-2'-phenetidide yields by coupling with diazotized:

| | |
|---|---|
| 1-amino-2-nitrobenzene | a yellowish dark brown. |
| 1-amino-2,5-dichlorobenzene | a violet brown. |
| 1-amino-2-nitro-4-methylbenzene | Do. |
| 1-amino-2-methoxy-5-chlorobenzene | Do. |
| 1-amino-2-methyl-4-chlorobenzene | a reddish dark brown. |
| 1-amino-2-methyl-4-nitrobenzene | a greenish black. |
| 1-amino-2-methyl-5-nitrobenzene | a reddish blackish brown. |
| 1-amino-2-chloro-5-ω-trifluoromethylbenzene | Do. |
| 1-amino-2-methoxy-6-nitrobenzene | a blackish brown. |
| 1-amino-2-methoxy-4-nitrobenzene | a blackish violet. |
| 1-amino-2-methoxybenzene-5-sulfodiethylamide | a blackish reddish brown. |
| 1-amino-2-methyl-5-benzoylamino-4-methylbenzene | a dark brown. |
| 1-amino-2-chloro-4-benzoylamino-5-methoxybenzene | Do. |
| 4-amino-2,5-dimethoxy-4'-nitro-1,1'-azobenzene | a greenish bluish black. |
| 4-amino-2-methyl-5-methoxy-2'-nitro-4'-methyl-1,1'-azobenzene | a reddish black. |

The 3-hydroxydiphenylenesulfide-2-carboxylic acid-4'-phenetidide yields by coupling with diazotized:

| | |
|---|---|
| 1-amino-2-chloro-5-ω-trifluoromethylbenzene | a blackish brown. |

The 3-hydroxydiphenylenesulfide-2-carboxylic acid-2'-nitranilide yields by coupling with diazotized:

| | |
|---|---|
| 1-amino-3-chlorobenzene | a brown. |

The 3-hydroxydiphenylenesulfide-2-carboxylic acid-3'-nitranilide yields by coupling with diazotized:

| | |
|---|---|
| 1-amino-3-chlorobenzene | a reddish brown. |
| 1-amino-2-methyl-3-chlorobenzene | a reddish blackish brown. |
| 1-amino-2-methyl-4-chlorobenzene | an olive dark brown. |
| 1-amino-2-methyl-5-chlorobenzene | a greenish black. |
| 1-amino-2-methoxy-5-nitrobenzene | a grey. |
| 1-amino-2-methoxy-5-ω-trifluoromethylbenzene | a reddish dark brown. |
| 2-aminodiphenylsulfone | a greenish grey. |

The 3-hydroxydiphenylenesulfide-2-carboxylic acid-4'-chloroanilide yields by coupling with diazotized:

| | |
|---|---|
| 1-amino-2,5-dichlorobenzene | a blackish brown. |

The 3-hydroxydiphenylenesulfide-2-carboxylic acid-3',4'-dichloroanilide yields by coupling with diazotized:

| | |
|---|---|
| 1-amino-2,5-dichlorobenzene | a dark brown. |

The 3-hydroxydiphenylenesulfide-2-carboxylic acid-3',5'-dichloroanilide yields by coupling with diazotized:

| | |
|---|---|
| 2,5-dichloroaniline | a dark brown. |

The 3-hydroxydiphenylenesulfide-2-carboxylic acid-2'-methyl-4'-chloroanilide yields by coupling with diazotized:

| | |
|---|---|
| 1-amino-2,5-dichlorobenzene | a blackish brown. |

The 3-hydroxydiphenylenesulfide-2-carboxylic acid-2'-methyl-4'-methoxyanilide yields by coupling with diazotized:

| | |
|---|---|
| 1-amino-2-nitrobenzene | a blackish brown. |
| 1-amino-2-methyl-3-chlorobenzene | Do. |
| 1-amino-2,5-dichlorobenzene | a violet blackish brown. |
| 1-amino-2-methyl-4-chlorobenzene | Do. |
| 1-amino-2-methoxy-5-chlorobenzene | Do. |
| 1-amino-2-methoxy-5-nitrobenzene | Do. |
| 1-amino-2-chloro-4-benzoylamino-5-methoxybenzene | Do. |

The 3-hydroxydiphenylenesulfide-2-carboxylic 1-amino-2-methyl-4-nitrobenzene_____ a greenish black.
1-amino-2-methoxy-4-nitrobenzene_____ Do.
1-amino-2-methyl-5-nitrobenzene_____ a black.
1-amino - 2 - chloro -5-ω- trifluoromethylbenzene. Do.
1-amino - 2 - methoxybenzene - 5 - sulfodiethylamide. a dark greenish brown.
1-amino - 2 - methyl - 5 - benzoylamino-4-methylbenzene. an olive blackish brown.
4-amino-2,5-dimethoxy-4'-nitro-1,1'-azobenzene. a greenish black.

The 3-hydroxydiphenylenesulfide-2-carboxylic acid-3'-methyl-4'-methoxyanilide yields by coupling with diazotized:

3-chloroaniline_____ a reddish dark brown.
3-nitroaniline_____ Do.
4-nitroaniline_____ Do.
2-nitroaniline_____ a blackish brown.
1-methyl-2-amino-5-nitrobenzene_____ a violet blackish brown.
1-amino-2-methyl-4-chlorobenzene_____ Do.
1 - amino - 2 - chloro-5-ω- trifluoromethylbenzene. a yellowish blackish brown.

the dyestuff corresponds to the following formula:

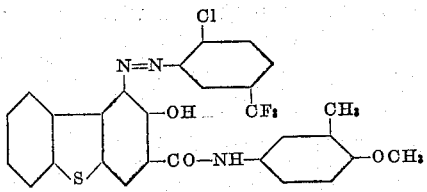

2,4' - dimethyl - 2' - nitro - 5 - methoxy - 4-amino-1,1'-azobenzene.   a greenish black.

The 3-hydroxydiphenylenesulfide-2-carboxylic acid-2'-methoxy-5'-chloroanilide yields by coupling with diazotized:

1 - amino - 2 - chloro-5- ω -trifluoromethylbenzene.   a blackish brown.

The 3-hydroxydiphenylenesulfide-2-carboxylic acid-2'-methyl-5'-chloroanilide yields by coupling with diazotized:

1-amino-2,5-dichlorobenzene_____ a dark brown.

The 3-hydroxydiphenylenesulfide-2-carboxylic acid-3',4'-dimethylanilide yields by coupling with diazotized:

2,5-dichloroaniline_____ a blackish brown.
1-amino-2-methyl-5-chlorobenzene_____ Do.
1-amino-2-chloro-5-ω-trifluoromethylbenzene. a yellowish blackish brown.
1-amino-2,4-dimethyl-5-benzoylaminobenzene. a yellowish dark brown.
4-amino-2,4'-dimethyl-2'-nitro-5-methoxy-1,1'-azobenzene. a black.

The 3-hydroxydiphenylenesulfide-2-carboxylic acid-2',4'-dimethoxyanilide yields by coupling with diazotized:

1-methyl-3-nitro-4-aminobenzene_____ a blackish brown.
1-methyl-2-amino-4-nitrobenzene_____ Do.
4-amino-3,2'-dimethyl-1,1'-azobenzene__ Do.
1,3-dimethyl-4-amino-6-benzoylaminobenzene. a reddish dark brown.
4-amino-2,3'-dimethyl-1,1'-azobenzene___ a black.

The 3-hydroxydiphenylenesulfide-2-carboxylic acid-2',5'-dimethoxyanilide yields by coupling with diazotized:

1-amino-2-chlorobenzene_____ a reddish brown.
1-amino-2-methyl-4-chlorobenzene_____ Do.
1-amino-2,5-dichlorobenzene_____ a violet dark brown.
1-amino-3-nitrobenzene_____ a reddish dark brown.
1-amino-2-methyl-3-chlorobenzene_____ Do.
1-amino-2-methyl-5-nitrobenzene_____ Do.
1-amino-2-methyl-4-nitrobenzene_____ a reddish black.
1-amino-2-methyl-5-benzoylamino - 4 - methylbenzene. a yellowish dark brown.
1-amino-2-chloro-5-ω-trifluoromethylbenzene. a reddish dark brown.
1 - amino - 2 - chloro - 4 - benzoylamino-5-methoxybenzene. a dark brown.

The 3-hydroxydiphenylenesulfide-2-carboxylic acid-3',5'-dimethoxyanilide yields by coupling with diazotized:

1-amino-2-methyl-4-chlorobenzene_____ a brown.

The 3-hydroxydiphenylenesulfide-2-carboxylic acid-3',6'-dimethoxy-4'-chloroanilide yields by coupling with diazotized:

1-amino-3-chlorobenzene_____ a reddish dark brown.
1-amino-2,5-dichlorobenzene_____ Do.
1-amino-2-methyl-3-chlorobenzene_____ Do.
1-amino-2-methyl-4-chlorobenzene_____ Do.
1 - amino - 2 - chloro - 5 - ω - trifluoromethylbenzene. Do.
1-amino-2-methyl-5-chlorobenzene_____ a black.
1-amino-3-nitrobenzene_____ a violet dark brown.
1-amino-2-methoxy-5-chlorobenzene_____ Do.
1 - amino - 2 - methoxybenzene - 5 - sulfodiethylamide. Do.
1-amino-2-methoxy-5-nitrobenzene_____ Do.
1-amino-2-methyl-5-nitrobenzene_____ a corinth.
1-amino-2-chloro-4-benzoylamino - 5 - methoxybenzene. a reddish blackish brown.

The 3-hydroxydiphenylenesulfide-2-carboxylic acid-2',4'-dimethoxy-5'-chloroanilide yields by coupling with diazotized:

1-amino-2,5-dichlorobenzene_____ a blackish brown.

The 3-hydroxydiphenylenesulfide-2-carboxylic acid-α-naphthalide yields by coupling with diazotized:

1-amino-2-chlorobenzene_____ a reddish dark brown.
1-amino-2,5-dichlorobenzene_____ a blackish brown.
1-amino-2-methyl-5-chlorobenzene_____ Do.
1-amino-2-chloro-5-trifluoro - methylbenzene. Do.
1-amino-2,4-dimethyl-5-benzoylaminobenzene. Do.
4-aminodiphenylamine-4',1''-azo-2''-methyl-4''-amino-5''-methoxybenzene. Do.
1-amino-3-nitrobenzene_____ a violet dark brown.
1-amino-2-methyl-3-chlorobenzene_____ Do.
1-amino-2-methyl-4-chlorobenzene_____ Do.
1-amino-2-methyl-5-nitrobenzene_____ Do.
1-amino-2-methoxy-5-chlorobenzene_____ Do.
1-amino-2-methyl-4-nitrobenzene_____ a black.
1-amino-2-nitro-4-methylbenzene_____ a bluish grey.
1-amino-2-methoxy-4-nitrobenzene_____ a reddish bluish black.
1-amino-2-methoxybenzene - 5 - sulfodiethylamide. a violet grey.
1-amino-2-methoxy-5-nitrobenzene_____ a blackish violet.
1-amino-2-methoxy-4-benzoylamino-5-methoxybenzene. a reddish dark blue.
4-amino - 2 - methyl-3'-methyl-1,1'-azobenzene. a brownish black.
4 - amino - 3-methyl-2'-methyl-1,1'-azobenzene. a greenish black.
4 - amino - 2,5-dimethoxy-4'-nitro-1,1'-azobenzene. Do.

The 2-methyl-6-(3'-hydroxy-2'-carboylaminodiphenylene-sulfide)-benzothiazole yields by coupling with diazotized:

1 - amino - 2 - chloro-5-ω-trifluoromethylbenzene.   a blackish brown.

The 1-(3'-hydroxy - 2' - carboylaminodiphenylene-sulfide) carbazole yields by coupling with diazotized:

1-amino-2-nitrobenzene_____ a grey.
1-amino-2-methyl-5-nitrobenzene_____ Do.
1-amino-2-methoxy-5-nitrobenzene_____ Do.
1-amino-2,5-dichlorobenzene_____ a yellowish dark brown.
1-amino - 2 - chloro-5-ω-trifluoromethylbenzene. a yellowish blackish brown.
1-amino-2-methyl-4-nitrobenzene_____ a black.
1-amino-2-methoxy-4-nitrobenzene_____ a bluish black.
4-chloro-2-amino-diphenylether_____ a blackish brown.
2-amino-diphenylenesulfone_____ Do.

The arylide from 2 mols of 3-hydroxydiphenylenesulfide-2-carboxylic acid and 1 mol of dianisidine yields by coupling with diazotized:

1-amino-2,5-dichlorobenzene_____ a dark brown.

The 6 - ethoxy - 2 -(3' - hydroxy-2'-carbonylaminodiphenylenesulfide)-benzothiazole yields by coupling with diazotized:

1-amino-2,5-dichlorobenzene_____ a brown.

*Example 4.*—34.9 grams of 3-hydroxydiphenylenesulfide-2-carboxylic acid-2'-anisidide are dissolved in water with the aid of aqueous caustic soda lye. Then sodium acetate is added, and after this a diazo solution prepared from 15.2 grams of 1-amino-2-nitro-4-methylbenzene is introduced. The blackish brown azodyestuff which separates and corresponding to the following formula:

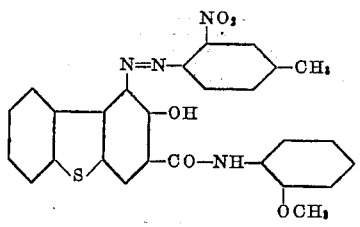

is sucked off, washed and dried.

This is a continuation-in-part of my application for Letters Patent Ser. No. 690,950, filed September 25, 1933.

I claim:

1. Waterinsoluble azodyestuffs of the general formula:

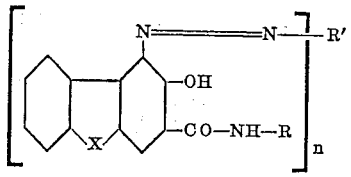

wherein X stands for a sulfur or an oxygen atom, R and R' for aromatic radicals and $n$ stands for one of the numbers one and two, yielding, when produced on the fibre, generally brown to blackish brown to black shades of good fastness properties.

2. Waterinsoluble azodyestuffs of the general formula:

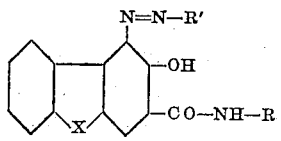

wherein X stands for a sulfur or an oxygen atom, R' stands for the radical of a diazo compound suitable for producing azodyestuffs and R stands for a radical of the benzene series, yielding, when produced on the fibre, generally brown to blackish brown to black shades of good fastness properties.

3. Waterinsoluble azodyestuffs of the general formula:

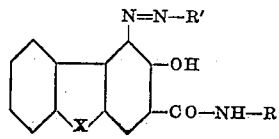

wherein X stands for a sulfur or an oxygen atom and R and R' stand for radicals of the benzene series, yielding, when produced on the fibre, generally brown to blackish brown to black shades of good fastness properties.

4. The dyestuff of the following formula:

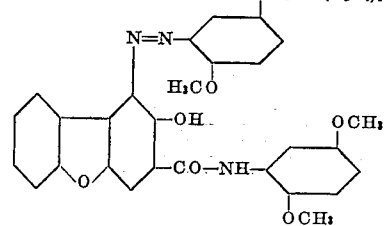

yielding, when produced on the fibre, dark brown shades of good fastness properties.

5. The dyestuff of the following formula:

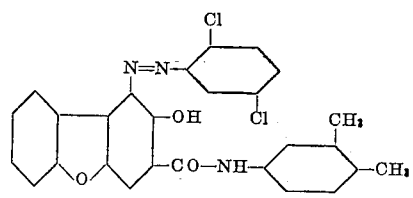

yielding, when produced on the fibre, reddish dark brown shades of good fastness properties.

6. The dyestuff of the following formula:

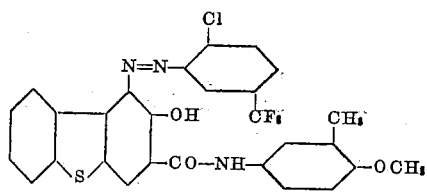

yielding, when produced on the fibre, yellowish blackish brown shades of good fastness properties.

7. Fibre dyed with a dyestuff as claimed in claim 1.

8. Fibre dyed with a dyestuff as claimed in claim 2.

9. Fibre dyed with a dyestuff as claimed in claim 3.

10. Fibre dyed with the dyestuff as claimed in claim 4.

11. Fibre dyed with the dyestuff as claimed in claim 5.

12. Fibre dyed with the dyestuff as claimed in claim 6.

FRIEDRICH MUTH.